(12) United States Patent
Lenchner et al.

(10) Patent No.: US 8,321,182 B2
(45) Date of Patent: Nov. 27, 2012

(54) SYSTEM AND METHOD FOR POSITIONING AND CONTROLLING AIR CONDITIONING TILES FOR OPTIMAL COOLING USING VORONOI DIAGRAMS

(75) Inventors: Jonathan Lenchner, North Salem, NY (US); Ravi Krishna Kosaraju, Johnston, RI (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/716,667

(22) Filed: Mar. 3, 2010

(65) Prior Publication Data

US 2011/0218773 A1 Sep. 8, 2011

(51) Int. Cl.
*G06F 17/50* (2006.01)
(52) U.S. Cl. .......................................................... 703/1
(58) Field of Classification Search ........................ 703/1
See application file for complete search history.

(56) References Cited

U.S. PATENT DOCUMENTS

| | | |
|---|---|---|
| 2005/0075065 A1 | 4/2005 | Nair |
| 2005/0182523 A1 | 8/2005 | Nair |
| 2006/0080001 A1 | 4/2006 | Bash et al. |
| 2006/0086119 A1 | 4/2006 | Malone et al. |
| 2006/0168975 A1 | 8/2006 | Malone et al. |
| 2007/0038414 A1 | 2/2007 | Rasmussen et al. |
| 2007/0078635 A1* | 4/2007 | Rasmussen et al. ............... 703/1 |
| 2007/0174024 A1 | 7/2007 | Rasmussen et al. |

OTHER PUBLICATIONS

Novoselac, Atila, "Combined Airflow and Energy Simulation Program for Building Mechanical System Design", The Pennsylvania State University The Graduate School College of Engineering, May 2005.*
Wikipedia, Voronoi diagram, dated Feb. 17, 2009; http://en.wikipedia.org/w/index.php?title=Voronoi_diagram&oldid=271331715.*
Chandrakant D. Patel, et al. "Thermal Considerations in Cooling Large Scale High Compute Density Data Centers", 2002 Inter Society Conference on Thermal Phenomena, IEEE Xplore, pp. 767-776.
Lorenzo Codecasa, et al., "Triangulation Method for Structure Functions of Multi-Directional Heat-Flows".
Cullen E. Bash, et al., "Dynamic Thermal Management of Air Cooled Data Centers", 0-7803-9524-7/06/copyright 2006IEEE Xplore, pp. 445-452.
Shabiul Islam et al., "Development of a Fuzzy Logic Controller Algorithm for Air-conditioning System", 0-7803-9731-2/06/copyright2006 IEEE Xplore, pp. 830-834.
S. Majumder, et al., "Solving Thermal Problems of Hot Chips using Voronoi Diagrams",1063-9667/06 copyright2006IEEE Xplore.

* cited by examiner

*Primary Examiner* — David Silver
(74) *Attorney, Agent, or Firm* — Preston J. Young, Esq.; McGinn IP Law Group, PLLC

(57) ABSTRACT

A system and method is disclosed that utilizes a Voronoi diagram to position and/or control perforated ventilation tiles in rooms of equipment requiring cooling air. The Voronoi sites used for constructing the Voronoi diagram are the air inlets of the equipment, and the Voronoi edges of the computed Voronoi diagram are used as the locations for placing (or controlling) perforated tiles.

20 Claims, 8 Drawing Sheets

Example 1

100

This code uses the voronoi function to plot the Voronoi diagram for 10 randomly generated points.

```
x = gallery('uniformdata',[1 10],0);
y = gallery('uniformdata',[1 10],1);

voronoi(x,y)
```

Example 1

100

This code uses the voronoi function to plot the Voronoi diagram for 10 randomly generated points.

```
x = gallery('uniformdata',[1 10],0);
y = gallery('uniformdata',[1 10],1);

voronoi(x,y)
```

200

300

SYSTEM AND METHOD FOR POSITIONING AND CONTROLLING AIR CONDITIONING TILES FOR OPTIMAL COOLING USING VORONOI DIAGRAMS

BACKGROUND OF THE INVENTION

1. Field of the Invention

The present invention generally relates to a method of locating and controlling perforated tiles for air conditioning in an equipment room such as a data center. More specifically, a Voronoi diagram, where the sites used for constructing the Voronoi diagram consist of line segments representing the locations of the air intake portions of equipment, is computed for a room to be provisioned for air conditioning. Sections of the Voronoi diagram are then sequentially eliminated and select remaining edges shifted with the resultant edges determining the best locations of perforated tiles for venting of the air conditioning. These remaining edges can also serve as a basis in a control mechanism to control the perforations if the degree of opening of the perforated tiles is controllable.

2. Description of the Related Art

The invention solves two fundamental problems in the design and management of a data center: (1) precisely where to locate perforated tiles to most cost effectively deliver/vent air conditioning to IT (Information Technology) equipment with air intake requirements, and (2) given a distribution of perforated tiles whose aperture can be programmatically controlled, how to optimally deliver air conditioning in response to the needs of IT equipment so that the equipment continuously operates within its safe temperature range.

Today, perforated tile are typically located in the center of each cold aisle of the data center, and delivery of air conditioning to IT equipment in need is done in a completely ad hoc fashion. Moreover, tiles whose aperture can be programmatically controlled are just beginning to make their way into the market place.

Therefore, a need continues to exist for improving the design of the locations of perforated tiles that deliver cooling air to environments housing devices that require cooling during operation. In addition, it would be useful to have a mechanism that can be computerized and that can also serve as the basis for controlling the perforations if the perforated tiles are controllable.

SUMMARY OF THE INVENTION

In view of the foregoing, and other, exemplary problems, drawbacks, and disadvantages of the conventional systems, it is an exemplary feature of the present invention to provide a structure (and method) in which a variation of the conventional Voronoi diagram calculation is used to provide design information for perforated cooling tiles in a room housing equipment requiring cooling such as a data center filled with IT components.

It is another exemplary feature of the present invention to provide a method in which the degree or percentage of opening of perforated tiles can be automatically controlled, in case perforated tiles, whose degree of opening can be mechanically controlled, are in use.

Thus, herein, a system and method is disclosed for the positioning and controlling of air conditioning tiles using Voronoi diagrams for optimal provisioning of cooling in equipment rooms. In the most traditional setting, the "sites" upon which a Voronoi diagram is built are points.

However, in the case of equipment having variable air intake requirements, where the equipment is housed in racks and pathways for airflow is obstructed by the presence of equipment, a new type of Voronoi diagram must be considered—namely, one in which the sites are one-sided segments pointing in the direction of the air intakes, and additionally where distance is not computed using Euclidean distance, but rather a distance such that the shortest path between two points cannot pass through a piece of equipment. It is this type of Voronoi diagram upon which the present tile layout and control methodology is based.

Thus, in a first exemplary aspect of the present invention, to achieve the above features and objects, described herein is a computerized method of designing or specifying the locations of perforated tiles for venting air to equipment in a facility, including: receiving, as inputs, information on a room size and locations of equipment and partitions within the room, including locations of cooling input vents of the equipment; calculating, using a processor on a computer, a Voronoi diagram to serve as a basis for locations of perforated tiles for delivering cooling air to said equipment, the equipment comprising the "sites" upon which the Voronoi diagram is computed; and providing locations of the perforated tiles, as output information.

In a second exemplary aspect of the present invention, also described herein is an apparatus, including: a graphical user interface (GUI) to permit user inputs and display results, inputs including information on a room size and locations of equipment and partitions within the room, including the locations of the air intake vents of the equipment; and a Voronoi module, for calculating, using a processor on the apparatus, a Voronoi diagram to serve as a basis for locations of perforated tiles for delivering cooling air to said equipment.

In a third exemplary aspect, also described herein is an equipment room, including: a plurality of equipment racks with equipment, at least one or more of the equipment having an associated cooling input vent for providing cooling air; a network of ducts to transport air under a predetermined pressure; and a plurality of perforated tiles at predetermined locations in the network of ducts, the perforated tiles providing opening in the network of ducts through which the pressurized air is provided to the cooling input vents, wherein the perforated tiles are located in cold aisles associated with the cooling input vents in accordance with locations based on a Voronoi diagram.

Thus, the present invention provides for optimal (i.e. most cost effective) provisioning of air conditioning, specifically when the air conditioning is fed into a pressurized sub-floor or plenum, and is vented through perforated tiles into an above-floor room or rooms consisting of stationary electrical equipment, some of which requires cool air at their air-intakes on order to keep their componentry at safe operating temperatures. It could also apply in the less traditional, but theoretically viable, scenario where cool air is vented from an above-ceiling area of a room through analogous perforated tiling, rather than from the sub-floor.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF AN EXEMPLARY EMBODIMENT OF THE INVENTION

Figure 1:
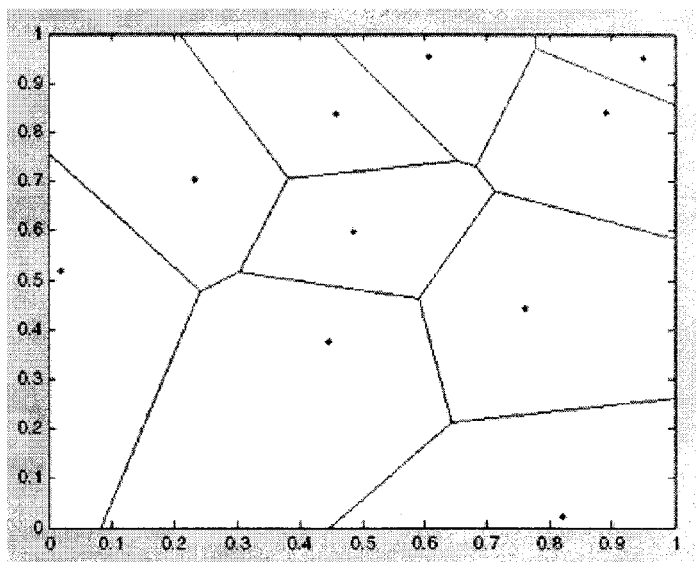
FIG. 1 shows a conventional method 100 of calculating a Voronoi diagram for a set of points in two-dimensional space, using one of the possible Matlab commands related to Voronoi diagrams, a computerized tool known to most engineers.

Referring now to the drawings, and more particularly to FIGS. 1-11, exemplary embodiments of the method and structures according to the present invention will now be discussed.

A Voronoi diagram is a decomposition of a metric space determined by distances to a specified discrete set of objects in the space, referred to as "sites". For example, in the simplest case, the set of objects is represented by a discrete set of points. Each site s has a Voronoi cell, V(s), consisting of all points closer to s than to any other site. In the Euclidean plane, where sites are again points, the Voronoi cells would be bounded by segments consisting of points in the plane that are equidistant between two nearest sites. These segments come together at nodes which are points equidistant to three (or more) sites.

The Voronoi diagram can also be defined by measuring distances to objects (i.e., sites) that are not points, such as line segments, as used in the method of the present invention. When the sites are line segments, as in the present invention, the Voronoi cells are not bounded only by straight lines, such as occurs when in the conventional Voronoi diagram having a set of discrete points as sites.

A weighted Voronoi diagram is one in which the distance to a site is biased or weighted, typically using a multiplicative weight, associated with the site. In the present invention, where sites are given by line segments signifying the air intake areas of equipment, the natural weighting is the air intake demand of each particular piece of equipment. Thus for a piece of equipment A that consumes only one fifth as much air as another piece of equipment B, to appear "equidistant" from a given point x in the plane, from the vantage point of the weighted Voronoi diagram, A would have to be five times closer to x than B.

The calculation of conventional Voronoi diagrams has been computerized. That is, FIG. 1 shows a sample calculation 100 using Matlab, a common computer software package familiar to most engineers and engineering students. This FIG. 100 appears on the Mathworks website as an example that demonstrates the calculation of the Voronoi diagram for ten random points, and this version of the Voronoi command provides the boundaries of the Voronoi cells for each of these ten points (i.e., sites). It is noted that the edges of the Voronoi diagram are all straight line segments when the sites consist of discrete points.

In contrast to FIG. 1, the present invention adapts the concepts of the conventional Voronoi diagram to be based on the analogous concept of using line segments as the Voronoi sites, rather than points. Therefore, the Voronoi diagram of the present invention provides the Voronoi cells that constitute the areas closest to each of these line segments that serve as sites. However, as shown in FIGS. 2 and 3, the present invention even further modifies the concepts of the conventional Voronoi diagram, as follows.

In a summary, a key element of the present invention is the utilization of Voronoi diagrams (in particular, the Voronoi diagram of line segments, where the line segments represent the air intake areas for various IT devices) to solve the problem of cooling air distribution. There are two features that distinguish the Voronoi diagrams of line segments considered in this invention from those discussed in the literature.

First, the line segments serving as Voronoi sites in this invention are "one-sided" in the sense that if a particular piece of equipment has an air intake area facing to the right, then the distance of a point just to the right of the line segment will be much smaller than the distance of the point to the line segment, if the point were just to the left of the line segment. For example, consider the illustration 200 shown in FIG. 2.

Figure 2:
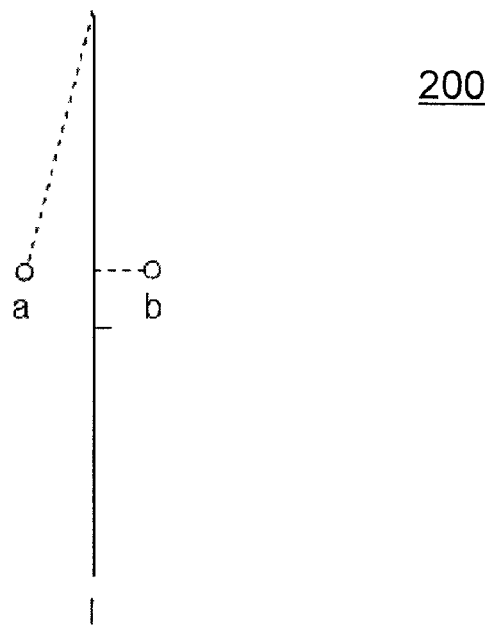
FIG. 2 shows how the present invention implements a variation 200 from the conventional Voronoi diagram calculation 100 shown in FIG. 1.
Figure 3:
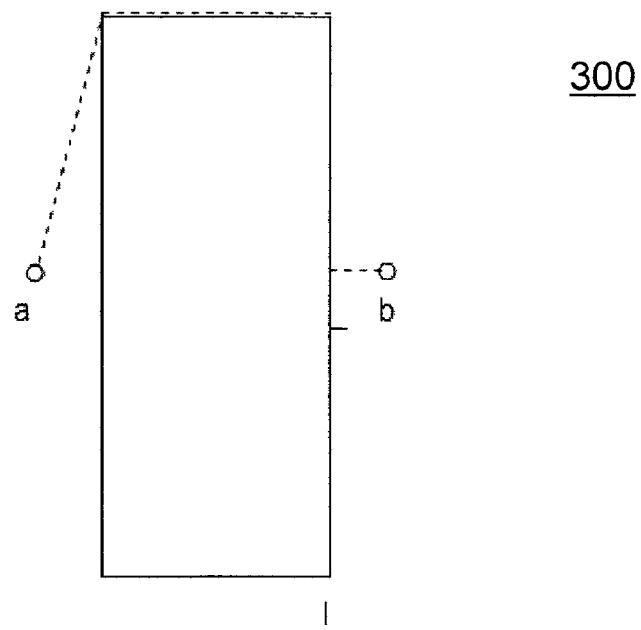
FIG. 3 shows a further modification 300 of the Voronoi diagram calculation, as taking into account the effect of the two-dimensional shape of the equipment racks, including barriers.

In FIG. 2, the one-sided line segment l is considered to be right-facing (as indicted by the right-pointing "ticky" mark in the center of the segment). The shortest distance from the point b to the segment l, given by the perpendicular dashed segment extending from point b to line l, is clearly much less than the shortest distance from point a to the right side of segment l, also depicted as a dashed segment, extending up and to the right of point a.

A second feature that distinguishes the Voronoi diagrams of the present invention from those considered in the literature, is that the paths indicating shortest distances from a point to a one-sided segment cannot travel through equipment. Thus, to flesh out the prior example, we really have something like the diagram 300 shown in FIG. 3.

In other words, the distance from point a to the right-facing segment/is given by the sum of the distance of the two dashed segments, the first of which is a right leaning segment and the second of which is a segment that goes along the top edge of the piece of equipment with which segment/is associated.

As we have alluded to in the preceding discussion, to achieve greatest accuracy, one should use a Voronoi diagram of weighted line segments. That is, since data centers store IT equipment in three dimensions, not two, if we have a rack of N servers or blades, and when projected onto the plane (floor of the data center) K of the servers/blades have the same air intake area, we would weight the projected segment by K-fold. Analogously, if it were K times more important to deliver cool air to a given piece of equipment, we could artificially weight said piece of equipment by K times.

One way to compute the Voronoi diagram of such weighted line segments is to superimpose a grid over the data center region, for example, where a grid cell of the discretized space is an industry standard two foot by two foot tile, and the shortest distance to each air intake segment is computed for the center of each tile. Distances are then weighted (i.e. multiplied) by the air-intake demands associated with each line segment. If a given tile then has a shortest weighted distance to one line segment which is also its shortest weighted distance to one or more additional segments, then the tile forms part of a Voronoi edge. The set of all tiles lying on Voronoi edges form the complete Voronoi diagram, for the given resolution.

The idea of placing tiles along Voronoi edges is that air conditioning should be vented at points equidistant between hypothetically equally-weighted competing IT or facilities devices. It is noted that in a typical data center only the IT equipment has air-intake demands. Although air conditioning units—also known as CRACs (Computer Room Air Conditioning units) have air inlets, the inlet air is not expected to be cold—in fact, just the opposite—it is expected to be warm.

The alternative would be to have tiles servicing individual devices, which would be somewhat more expensive. The latter approach is not often used in practice. It is possible to mix tiling dedicated to certain high value IT/facilities equipment and tiling serving multiple devices per the Voronoi approach advocated by the present invention. Indeed the method of the present invention sometimes leads to placement of tiles which service individual machines or individual racks of machines.

Figure 4:
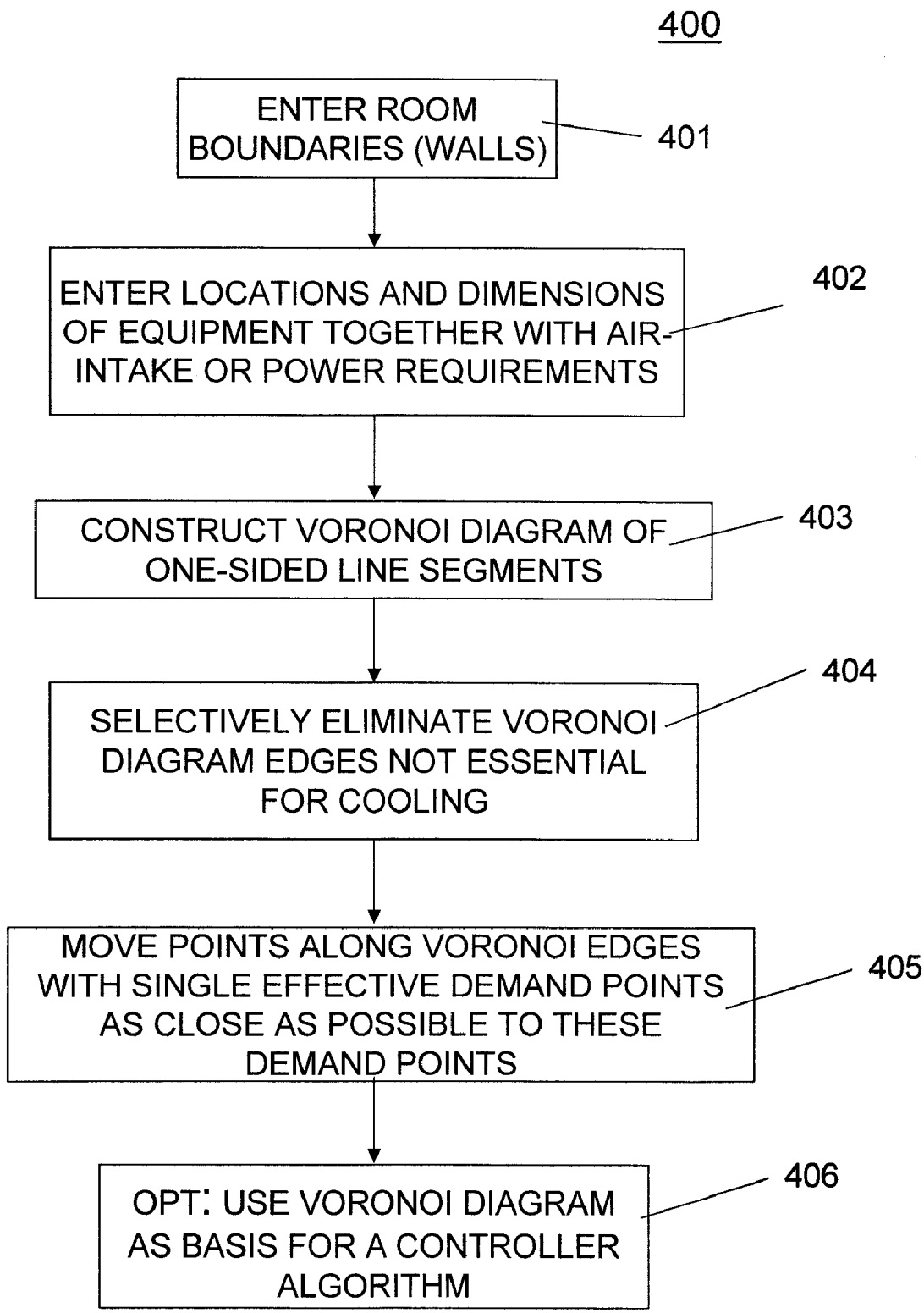
FIG. 4 shows a flowchart 400 of an exemplary embodiment of the present invention.

The method of the present invention can be summarized by the exemplary flowchart 400 shown in FIG. 4. In step 401, the boundary/set of walls delineating the equipment room are entered.

In step 402, locations, dimensions and air-intake or power requirements of the racks of equipment requiring cool air are similarly entered, including locations of the air input vents. Air intake requirements are assumed to be proportional to power requirements. If air intake requirements are known throughout the data center they should be entered in lieu of power requirements. Also, as racks are populated with new equipment their power and air intake requirements will change, and this information should be changed, resulting in an updated computation.

In step 403, an approximate Voronoi diagram is constructed, based on one-sided line segments consisting of the air intake areas of the racks (segments point in the direction of the incoming air), and including weighting of equipment in the racks as previously described.

In step 404, if necessary, sections (e.g., "edge sections") of the Voronoi diagram are selectively eliminated. In general, if a point p (i.e. a pixel in the resolution of the computation) on a Voronoi edge is equidistant between two or more nearest sites (one sided segments indicative of air intake in equipment housed in the rack) $s_1, \ldots, s_k$ with points $p_1, \ldots, p_k$ such that $p_1$ lies in $s_1, \ldots, p_k$ lies in $s_k$ and each $p_i$ is the closest point to p in each of the $s_i$ but there are points $q_1, \ldots, q_k$ on other Voronoi edges (the $q_1, \ldots, q_k$ not necessarily distinct) such that $|q_i-p_i|<|p-p_i|$ for all i, then the point (pixel) p can be deleted, and analogously, one may delete segments consisting of a contiguous set of such deletable pixels. In the above, for generic points x and y, $|x-y|$ denotes the Euclidean distance between points x and y.

In step 405, we consider the points (pixels) p on remaining Voronoi edges which are equidistant from points $\{p_i\}$ with each $p_i$ located on corresponding site $s_i$ but for which all but one of the $\{p_i\}$, say $p_j$, have closer points than p on the remaining Voronoi edges. In this case the point (pixel) p can be moved arbitrarily close to the single actual demand point $p_j$.

In step 406, if the air conditioning system has a mechanism to control the relative amount of cooled air venting through tiles and some significant fraction of these tiles support this capability, the resultant remaining Voronoi diagram sections can also be subsequently used as a basis for controlling the air flow, including any effects of turning on/off various equipment within the racks having weights predesignated to those racks. At any point in time the tiles which are completely opened are those which most closely lie along the edges of the Voronoi Diagram reflecting the current air conditioning demand of the equipment. Tiles which lie less close to a Voronoi edge or which only slightly cross a Voronoi edge would be a opened by a relatively smaller fraction.

Figure 5:
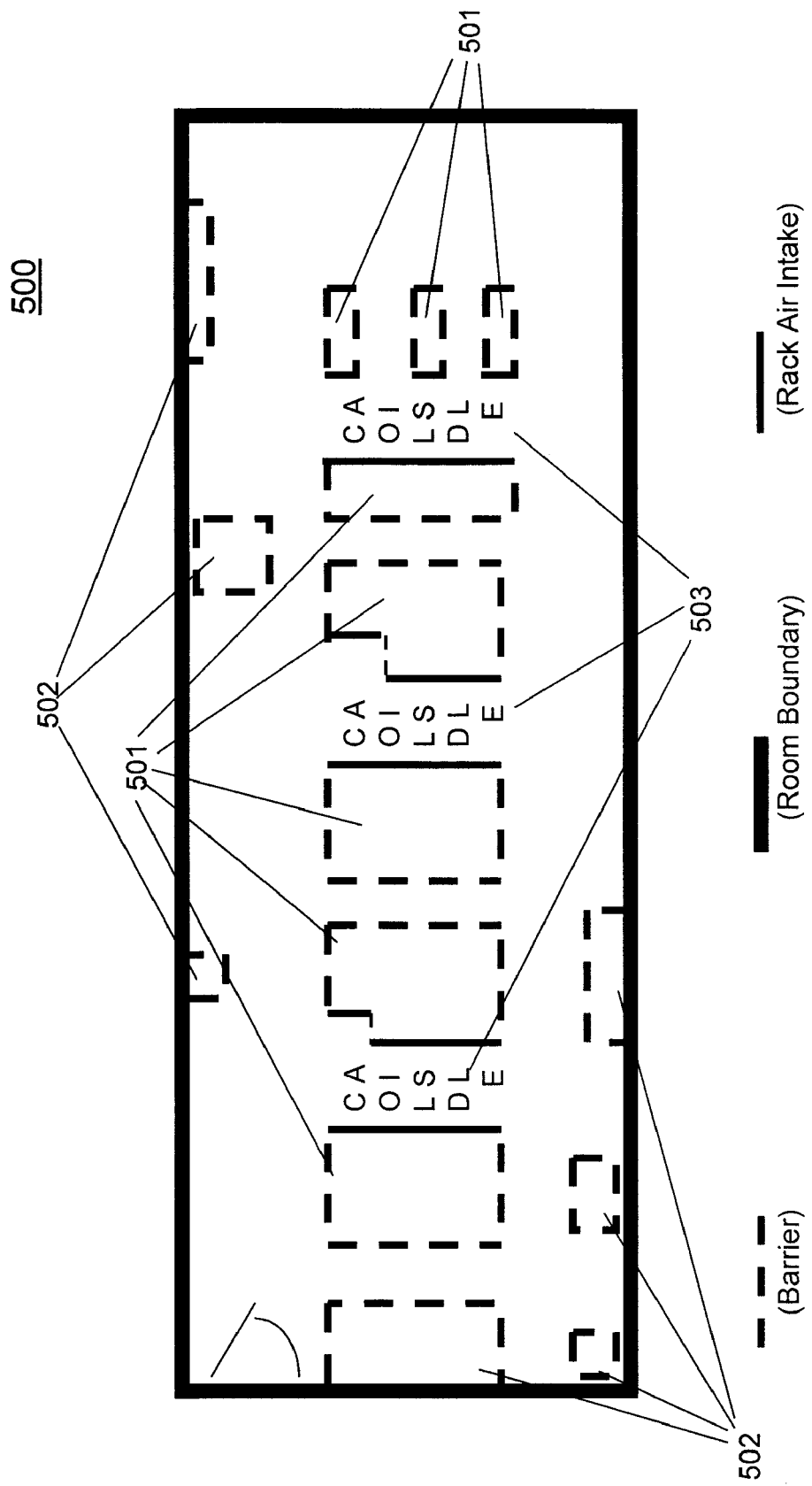
FIG. 5 shows an example floor layout 500 demonstrating the method of the present invention.
Figure 6:
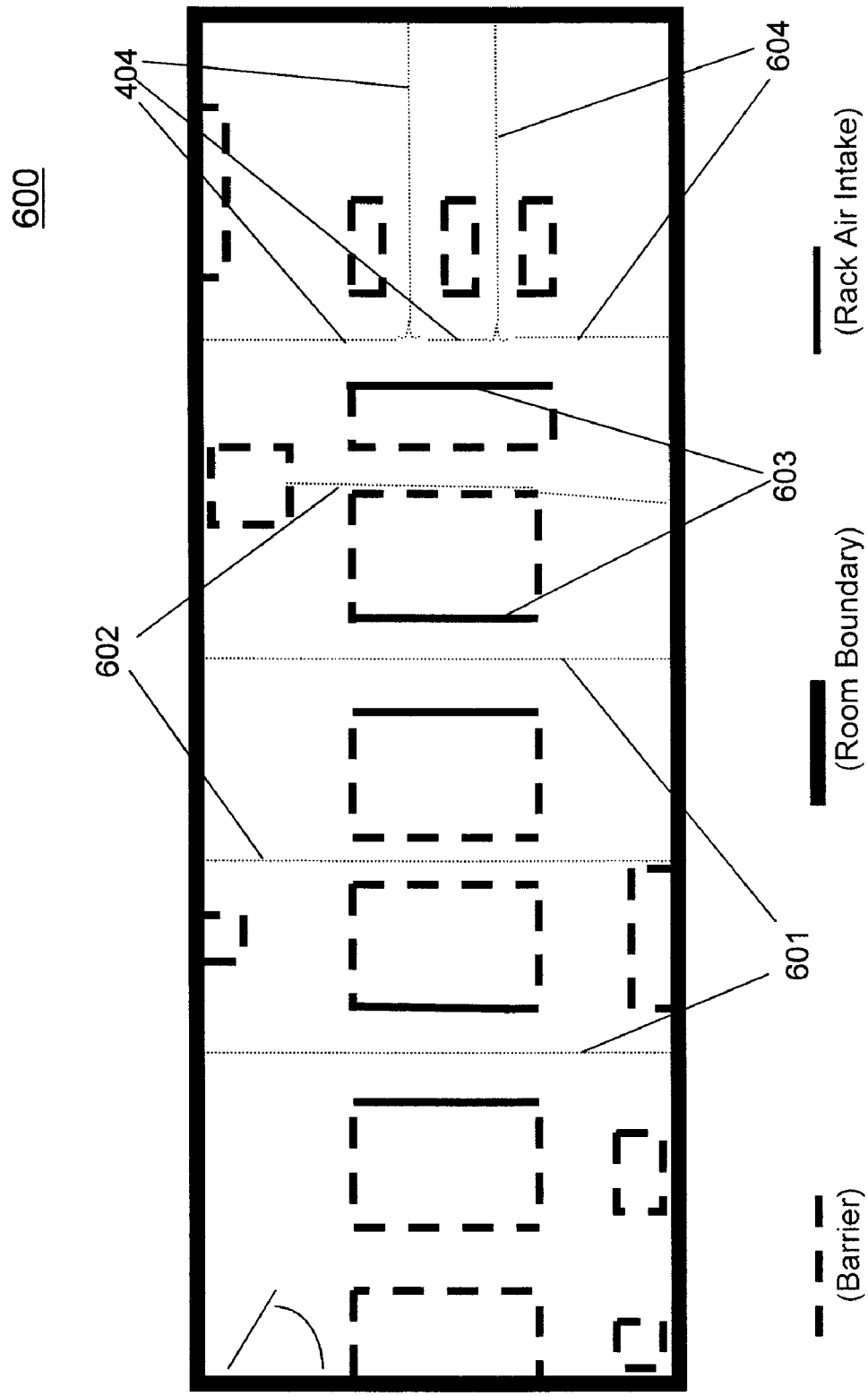
FIG. 6 shows the modified Voronoi diagram 600 of the example demonstrated in FIG. 5.
Figure 7:
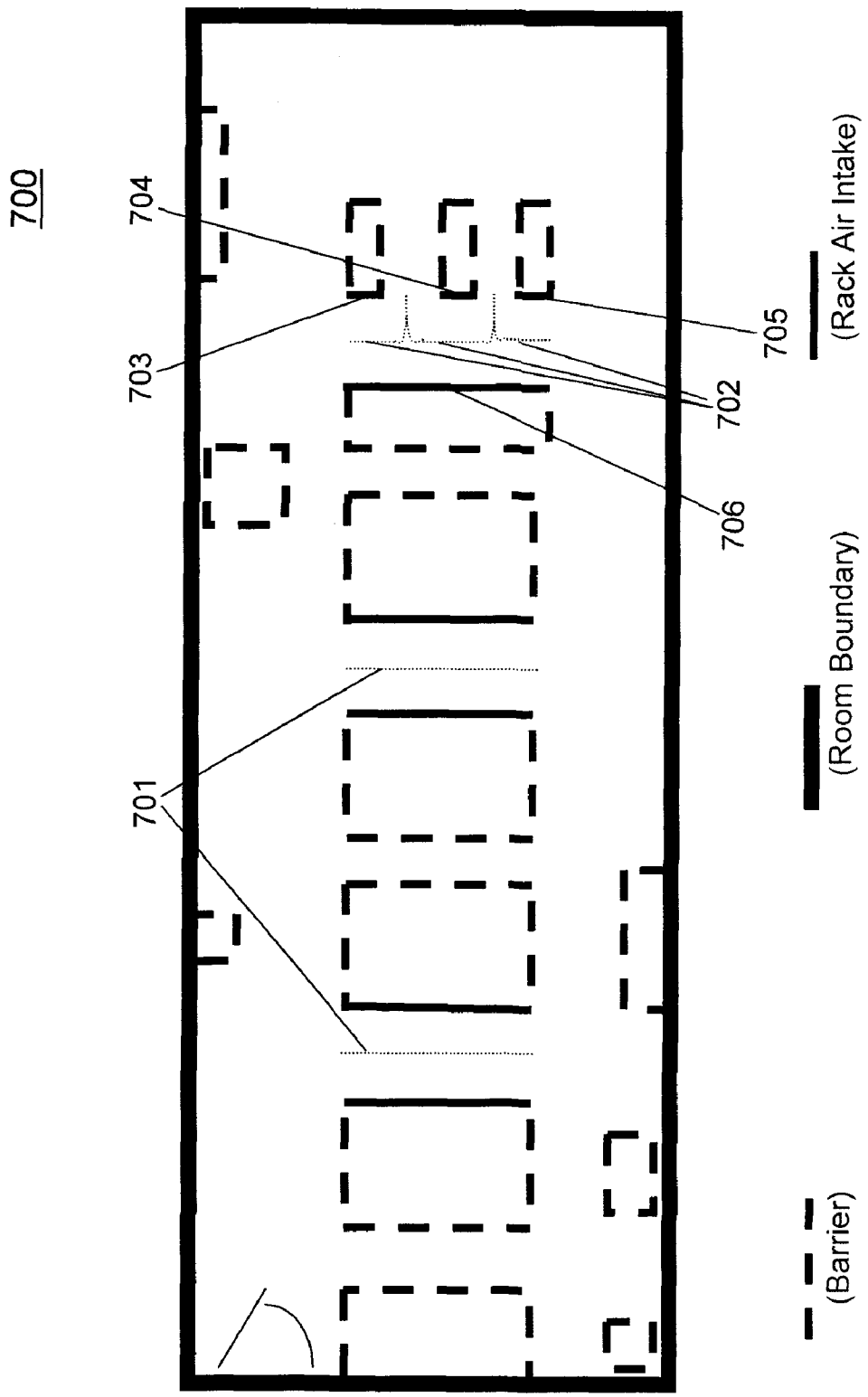
FIG. 7 shows the resultant placement 700 of the cooling vents for the example scenario 500 of FIG. 5.

An example of the method will now be demonstrated, using FIGS. 5-7. FIG. 5 shows an exemplary equipment room layout 500, which could be a data center filled with racks 501 of IT components and assorted non-IT equipment 502. Racks in this data center are configured in the customary cold aisle/hot aisle manner. Cold aisles 503 are typically where facing rack items have their air intakes and hot aisles are where facing rack items have their air out-takes (exhausts). All IT equipment in this figure which have air intakes (marked with solid lines) have associated out-takes (exhausts) on the opposite sides. It can be further assumed that a standard grid (not shown) is implied for this layout or could be easily supplied for any room layout.

It is typically of prime importance to deliver cold air to the air intakes. Hence, the first step in the procedure of the present invention would be to generate the Voronoi diagram of the set of weighted solid line segments indicative of air inlet areas in the diagram of FIG. 5. The weight given to each segment is determined by the air intake requirements of the IT equipment associated with that line segment. More formally, the weight of the segment is the density of the air intake requirements per length of segment.

Thus, a rack with IT equipment with three times the air intake requirements as another rack would get three times the weighting. To keep things simple, we will assume that all racks draw roughly the same amount of power and have roughly the same air intake requirements. The resulting Voronoi diagram 600 is shown in FIG. 6.

Of particular interest are those edges 601 directly related to the "center lines" of the cold aisles. Some of the other Voronoi edges 602 go through hot aisles and service demand points along segments (air intakes) which are more efficiently serviced through other Voronoi edges and so these segments may be entirely deleted. Notice that not all segments are completely straight (as in the bottom of the right segment 603 which is piecewise straight, or the segments 604 which are slightly curved). As well as completely deleting segments, we are able to shorten segments using the same rule of thumb as for deleting segments.

The result is the exemplary configuration 700 shown in FIG. 7S, showing Voronoi edges 701 remaining as those in cold aisles that represent the edges closest to the demand points of the racks serviced by those cold aisles. The Voronoi edges remaining to the right 702 are a bit more interesting.

Depending on the configuration of tiles in that area, these edges 702 may or may not be best approximated by a set of vertically aligned perforated tiles. It may in fact be preferable to place a perforated tile vertically between the air intake 703 and 704 and another between the air intake 704 and 705, and possibly even additional perforated just to the left of these. The idea is to use perforated tiles to best approximate the idealized Voronoi edges remaining in FIG. 7.

In this case (the case where the best approximation of the Voronoi edges by perforated tiles includes tiles between edges 703 and 704 and between edges 704 and 705), there will likely be pieces of edges, in the vicinity of the endpoints of the lines emanating from 702, that are then effectively servicing closest demand points only on the air inlet segment 706. As a consequence, this segment can in turn be moved arbitrarily close to the air inlet segment 706.

Figure 8:
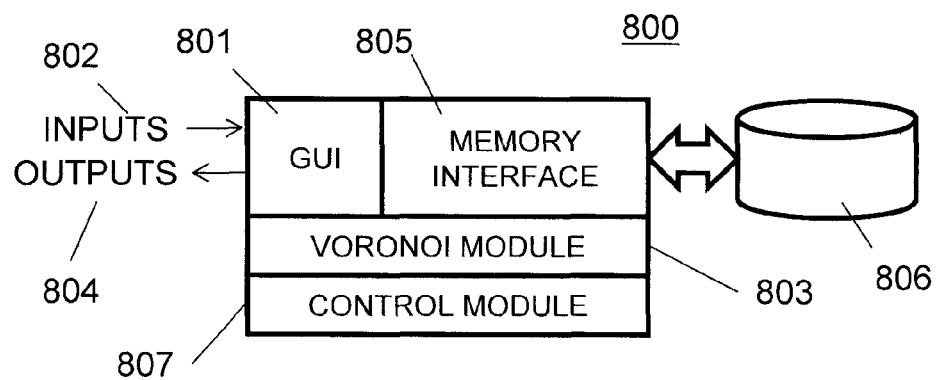
FIG. 8 shows an exemplary block diagram 800 of a software program that implements the method of the present invention.

The flowchart of FIG. 4 can be implemented as a computerized design method, such as exemplarily shown in the apparatus 800 of FIG. 8, wherein a designer uses a Graphical User Interface (GUI) 801 to provide design inputs 802 into the design tool, such as room dimensions, size and locations of partitions, and size and locations of electrical/electronic devices within the room having air intake requirements, along with the corresponding air-intake coordinates, or if not available/easily obtained, power requirements of said equipment.

Once air-intake requirements or their surrogate, power requirements, are obtained, a two dimensional rendering of the data center is made, with air inlets represented by straight line segments. The segments are given weightings according to the air-intake demand density (or its surrogate, power demand density) of the equipment corresponding to each segment. This design input is entered into the design tool using input devices such as a keyboard and mouse.

The Voronoi module 803 can be activated by user input to calculate the most appropriate positioning of perforated tiles for the ventilating of cooled air, as described above, providing output 804. Memory interface 805 interfaces with memory 806, as required, and control module 807 provides the overall functional control of the application program, as implemented in a version involving a computer.

As noted above, electrical/electronic equipment located on the same vertical support component could be indicated by appropriate weighting of line segments within a two-dimensional layout of the room. As an initial design consideration, the weighting would be given as if all components in a given rack were completely powered up so that locations and sizes of the perforated tiles would take into account the maximum power (or air intake) requirements that would be reasonably expected during normal operation, including the possibility that some components may not be completely powered up at all times during normal operation of the facility.

Figure 9:
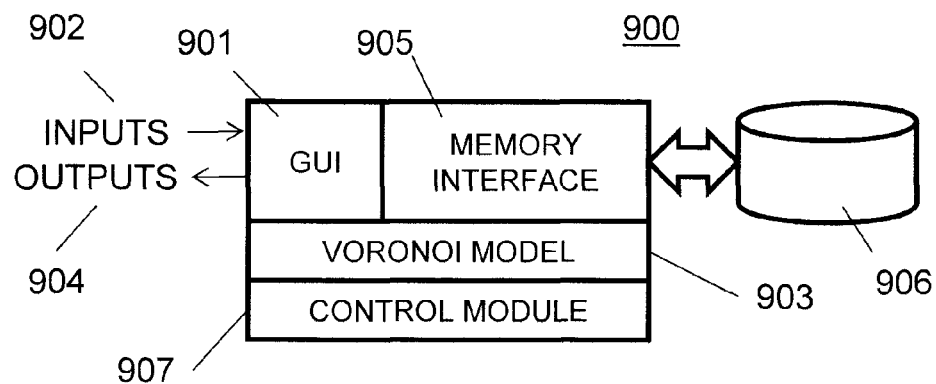
FIG. 9 shows an exemplary block diagram 900 of a software implementation of a controller for controlling the airflow to a system having vents placed in accordance with the method of the present invention.

As exemplarily shown in FIG. 9, a controller of the perforated tiles can similarly be achieved by an apparatus 900 (implemented in any one of software, hardware, or firmware) shown as implemented in software using a computer similar to the design tool 800 shown in FIG. 8 except that, since room dimensions, equipment locations, and tile locations and sizes are now known, the inputs 902 to the controller 900 becomes sensor inputs providing information as to which electrical/electronic components on various racks are currently operating, including, if attainable, an indication of their respective power utilizations, thereby effectively providing weighting information as the input into the controller 900. The heart of the controller 900 is the Voronoi model 903 developed during the design stage. The output 904 of the controller 900 is a signal that controls the size of the opening of each perforated tile in the system, as based upon sensing which localized area requires more cooling air based on current conditions.

Exemplary Hardware Implementation

Figure 10:
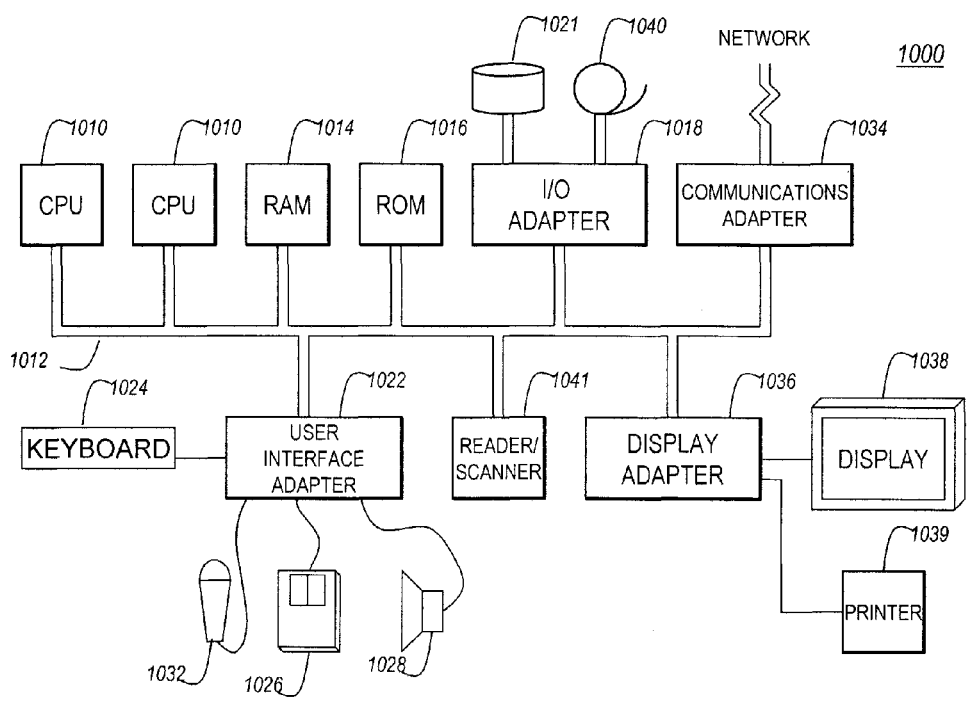
FIG. 10 illustrates an exemplary hardware/information handling system 1000 for incorporating the present invention therein.
Figure 11:
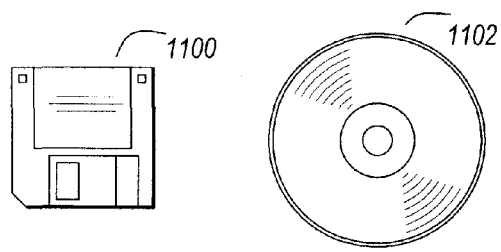
FIG. 11 illustrates a signal bearing medium 1100 (e.g., storage medium) for storing steps of a program of a method according to the present invention.

FIG. 10 illustrates a typical hardware configuration 1000 of an information handling/computer system in accordance with the invention and which preferably has at least one processor or central processing unit (CPU) 1010.

The CPUs 1010 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1010 and hardware above, to perform the method of the invention.

This signal-bearing storage media may include, for example, a RAM contained within the CPU 1010, as represented by the fast-access storage for example. Alternatively, the instructions may be contained in another signal-bearing media, such as a magnetic data storage diskette 1100,1102 (FIG. 11), directly or indirectly accessible by the CPU 1010.

Whether contained in the diskette 1100,1102, the computer/CPU 1010, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including transmission media memory devices having instructions stored in digital and analog format and memory devices in communication links and wireless devices. In an illustrative embodiment of the invention, the machine-readable instructions may comprise software object code.

Thus, the present invention provides for optimal provisioning of air conditioning, specifically when the air conditioning is fed into a pressurized sub-floor or plenum, and is vented through perforated tiles into an above-floor room or rooms consisting of stationary electrical equipment, some of which requires cool air at their air-intakes on order to keep their componentry at safe operating temperatures.

The invention would also apply in the less traditional, but theoretically viable, scenario where cool air is vented from an above-ceiling area of a room through analogous perforated tiling, rather than from the sub-floor. The equipment utilizing the cool air need not be IT or even electrical equipment, but could be any devices that need cooling. In addition the cooling needs of the devices need not be constrained to a specified air inlet area, but could apply to the entire area of the objects, the entire perimeter, or a portion of the perimeter, or a portion of the area of the objects.

Moreover, while the above explanation has used two dimensional renderings and the computation of a 2D Voronoi diagram, it is possible to consider the room in 3D and even, if practical, consider the 3D Voronoi diagram.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A computerized method of designing or specifying the locations of perforated tiles for venting air to equipment in a facility, said method comprising:

receiving, as inputs, information on a size of a room and locations of equipment and partitions within said room, including identification of cooling input vents of said equipment;

calculating, using a processor on a computer, a Voronoi diagram to serve as a basis for locations of perforated tiles for delivering cooling air to said equipment, said equipment comprising sites upon which the Voronoi diagram is computed; and providing locations of said perforated tiles, as output information.

2. The method of claim 1, wherein said equipment comprises information technology (IT) equipment and said facility comprises a data center.

3. The method of claim 1, wherein portions of edges of said Voronoi diagram are selectively eliminated as edges unrelated to said delivery of air to equipment.

4. The method as in claim 3, wherein points along Voronoi edges with single closest points along Voronoi edges with single closest Voronoi sites are moved as close as possible to these sites.

5. The method of claim 3, wherein the only edges of a calculated Voronoi diagram that remain comprise edges consisting of points which are closest Voronoi edge points to some demand point.

6. The method of claim 1, wherein said Voronoi diagram comprises a plurality of sites s, a corresponding plurality of Voronoi cells, V(s), each said Voronoi cell V(s) consisting of all points closer to site s than to any other site.

7. The method of claim 6, wherein said sites comprise a set of line segments rather than a set of discrete points, said line segments representing equipment with air intake requirements.

8. The method of claim 6, wherein said line segments used as said sites comprise said locations of cooling input vents for said equipment.

9. The method of claim 8, wherein said line segments are considered to have a property of having an indicated side from which a distance in said Voronoi diagram is based.

10. The method of claim 5, wherein distances to sites are taken such that a shortest path between two points may not cross any piece of equipment.

11. The method of claim 1, wherein distances of points to sites are weighted multiplicatively by a relative density of air intake requirements of equipment corresponding to a given segment, said relative density meaning a total air intake demand per unit length of segment.

12. The method claim 1, further comprising:
constructing a set of squares to provide an overlay grid of a layout of said room; and
using midpoints of said squares as a basis to construct said Voronoi diagram.

13. The method of claim 1, further comprising using said calculated Voronoi diagram as a basis for a model for controlling cooling air to said equipment as cooling requirements change as equipment is turned on or off.

14. A non-transitory storage medium tangibly embodying a set of instructions, which when executed by a processor, perform the method of claim 1.

15. The storage medium of claim 14, as comprising one of:
a random access memory (RAM) device on a computer currently executing said method;
a read only memory (ROM) device on a computer storing said instructions, for selectively executing said method;
a read only memory (ROM) device on a computer on a network that is storing said instructions, for selectively downloading said instructions to a second computer on the network; and
a standalone memory device that is storing said instructions, said standalone memory device intended to be inserted into an input interface of a computer, for selectively uploading said instructions onto the computer.

16. An apparatus, comprising:
at least one processor; and
a memory device, said memory device tangibly embodying a set of computer-readable instructions for:
a graphical user interface (GUI) to permit user inputs and display results, inputs including information on a room size and locations of equipment and partitions within said room, including the locations of the air intake vents of said equipment; and
a Voronoi module, for calculating, using a processor on said apparatus, a Voronoi diagram to serve as a basis for locations of perforated tiles for delivering cooling air to said equipment.

17. The apparatus of claim 16, wherein sites used for said calculating said Voronoi diagram comprises line segments representing locations of air inlet ducts for said equipment.

18. The apparatus of claim 17, wherein distance measurements for said calculating said Voronoi diagram include an aspect of a side of each said line segment and an aspect of any barriers related to each said line segment.

19. The apparatus of claim 17, wherein each said line segment has associated therewith an aspect of weight, said weight aspect indicative of multiple equipment associated with each line segment.

20. An equipment room, comprising:
a plurality of equipment racks with equipment, at least one or more said equipment having an associated cooling input vent for providing cooling air;
a network of ducts to transport air under a predetermined pressure; and
a plurality of perforated tiles at predetermined locations in said network of ducts, said perforated tiles providing opening in said network of ducts through which said pressurized air is provided to said cooling input vents,
wherein said perforated tiles are located in cold aisles associated with said cooling input vents in accordance with locations based on a Voronoi diagram.

* * * * *